US012769224B2

(12) United States Patent
Nakai

(10) Patent No.: US 12,769,224 B2
(45) Date of Patent: Oct. 20, 2026

(54) CLEANING DEVICE, PROCESS CARTRIDGE, AND IMAGE FORMING APPARATUS

(71) Applicant: Hiroshi Nakai, Kanagawa (JP)

(72) Inventor: Hiroshi Nakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/986,749

(22) Filed: Dec. 19, 2024

(65) Prior Publication Data

US 2025/0208532 A1 Jun. 26, 2025

(30) Foreign Application Priority Data

Dec. 22, 2023 (JP) ................................ 2023-217122

(51) Int. Cl.

*G03G 21/16* (2006.01)
*G03G 15/02* (2006.01)
*G03G 21/18* (2006.01)

(52) U.S. Cl.

CPC ..... *G03G 15/0258* (2013.01); *G03G 21/1828* (2013.01)

(58) Field of Classification Search

CPC ........... G03G 15/0225; G03G 15/0258; G03G 21/0058; G03G 21/1828
USPC ................................ 399/111, 123, 159, 350
See application file for complete search history.

(56) References Cited

U.S. PATENT DOCUMENTS

| | | | | |
|---|---|---|---|---|
| 5,619,311 A | | 4/1997 | Kurokawa et al. | |
| 6,987,944 B2 | * | 1/2006 | Shakuto | G03G 15/0291 399/353 |
| 7,848,694 B2 | * | 12/2010 | Nakatake | G03G 21/0017 399/350 |
| 8,000,627 B2 | * | 8/2011 | Mizuishi | G03G 15/0225 399/176 |
| 8,406,678 B2 | * | 3/2013 | Shouno | G03G 15/161 399/357 |
| 8,494,404 B2 | * | 7/2013 | Takagi | G03G 15/0225 399/357 |
| 2002/0106212 A1 | | 8/2002 | Amemiya et al. | |
| 2003/0044196 A1 | | 3/2003 | Amemiya et al. | |
| 2004/0228648 A1 | | 11/2004 | Yanagida et al. | |
| 2013/0216286 A1 | | 8/2013 | Hasegawa et al. | |
| 2013/0315642 A1 | | 11/2013 | Nakai et al. | |
| 2024/0231253 A1 | | 7/2024 | Nakai | |

FOREIGN PATENT DOCUMENTS

| | | | | | |
|---|---|---|---|---|---|
| JP | H06-342237 A | | 12/1994 | |
| JP | 2002-221883 A | | 8/2002 | |
| JP | 2004-361916 A | | 12/2004 | |
| JP | 2006208418 A | * | 8/2006 | G03G 21/0035 |
| JP | 2008-070532 A | | 3/2008 | |
| JP | 2009199027 A | * | 9/2009 | G03G 21/0035 |
| JP | 2009294595 A | * | 12/2009 | |
| JP | 2017-173737 A | | 9/2017 | |

* cited by examiner

*Primary Examiner* — Hoan H Tran
(74) *Attorney, Agent, or Firm* — XSENSUS LLP

(57) ABSTRACT

A cleaning device includes a cleaner to contact a surface of a rotator to clean the surface of the rotator. The cleaner is a roller that includes a foam layer to contact the surface of the rotator. A coefficient of static friction of a surface of the foam layer measured by an Euler belt method is 0.5 or more.

20 Claims, 7 Drawing Sheets

CLEANING DEVICE, PROCESS CARTRIDGE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-217122, filed on Dec. 22, 2023, in the Japan Patent Office, the entire disclosure of which is hereby incorporated by reference herein.

BACKGROUND

Technical Field

Embodiments of the present disclosure relate to a cleaning device, a process cartridge, and an image forming apparatus.

Related Art

In an electrophotographic image forming apparatus, a surface of a photoconductor serving as an image bearer is charged, the charged surface of the photoconductor is exposed to light to form an electrostatic latent image, and toner is supplied to the electrostatic latent image to form a toner image. The toner image formed on the photoconductor is transferred onto a recording sheet and is fixed on the recording sheet by receiving heat and pressure. Untransferred toner remains on the surface of the photoconductor after the toner image is transferred. The surface of the photoconductor is cleaned by a cleaning blade before the next charging process starts. When untransferred toner remaining on the surface of the photoconductor after the transfer of the toner image is not completely removed in a cleaning process and reaches a region in which the untransferred toner is close to or contacts a charging roller, the untransferred toner may adhere to the charging roller and a transfer belt.

SUMMARY

In an embodiment of the present disclosure, a cleaning device includes a cleaner to contact a surface of a rotator to clean the surface of the rotator. The cleaner is a roller that includes a foam layer to contact the surface of the rotator. A coefficient of static friction of a surface of the foam layer measured by an Euler belt method is 0.5 or more.

In another embodiment of the present disclosure, an image forming apparatus includes a latent image bearer, a charger, a developing device, and a cleaning device. The latent image bearer bears a latent image. The charger includes a rotator to charge a surface of the latent image bearer. The developing device develops the latent image to form a toner image. The cleaning device includes a cleaner to contact a surface of the rotator to clean the surface of the rotator. The cleaner is a roller including a foam layer to contact the surface of the rotator. A coefficient of static friction of a surface of the foam layer measured by an Euler belt method is 0.5 or more.

In still another embodiment of the present disclosure, a process cartridge detachably attachable to a body of an image forming apparatus includes a latent image bearer, a charger, and a cleaning device. The latent image bearer bears a latent image. The charger includes a rotator to charge a surface of the latent image bearer. The cleaning device includes a cleaner to contact a surface of the rotator to clean the surface of the rotator. The cleaner is a roller including a foam layer to contact the surface of the rotator. A coefficient of static friction of a surface of the foam layer measured by an Euler belt method is 0.5 or more.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
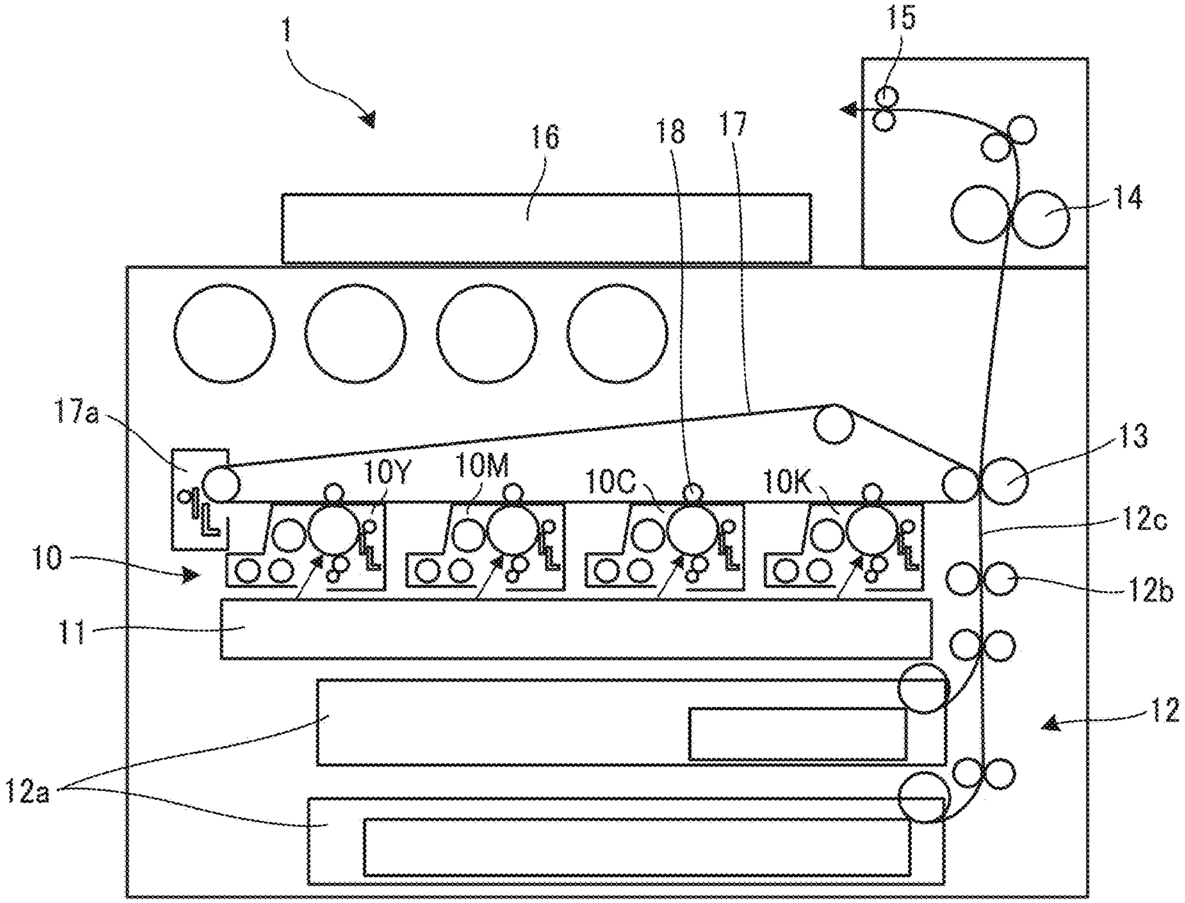
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, a description is given below of a cleaning device, a process cartridge, and an image forming apparatus according to the present embodiment of the present disclosure. The present disclosure is not limited to the following embodiments, but can be changed within the range that can be conceived of by those skilled in the art, such as other embodiments, additions, modifications, deletions, and the scope of the present disclosure encompasses any aspect as long as the aspect achieves the operation and advantageous effect of the present disclosure.

Figure 2:
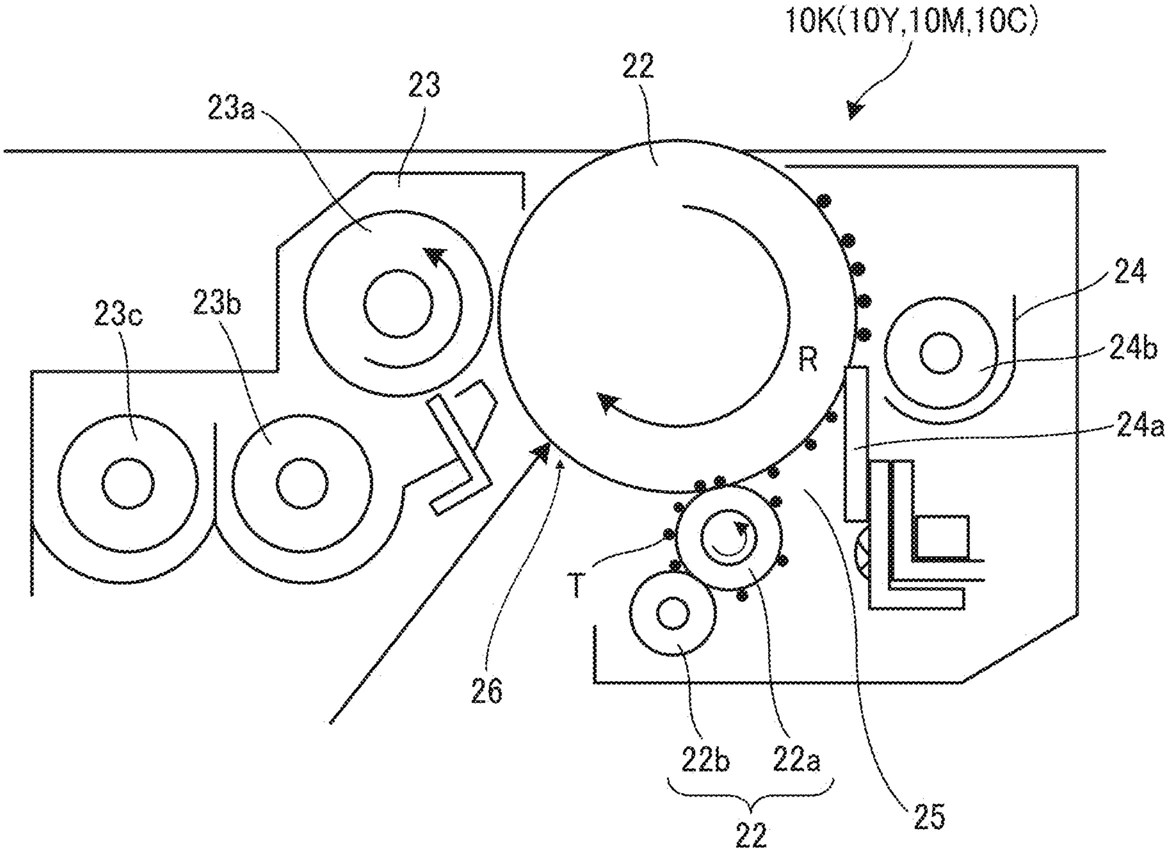
FIG. 2 is a schematic view of a process cartridge according to an embodiment of the present disclosure.
Figure 3:
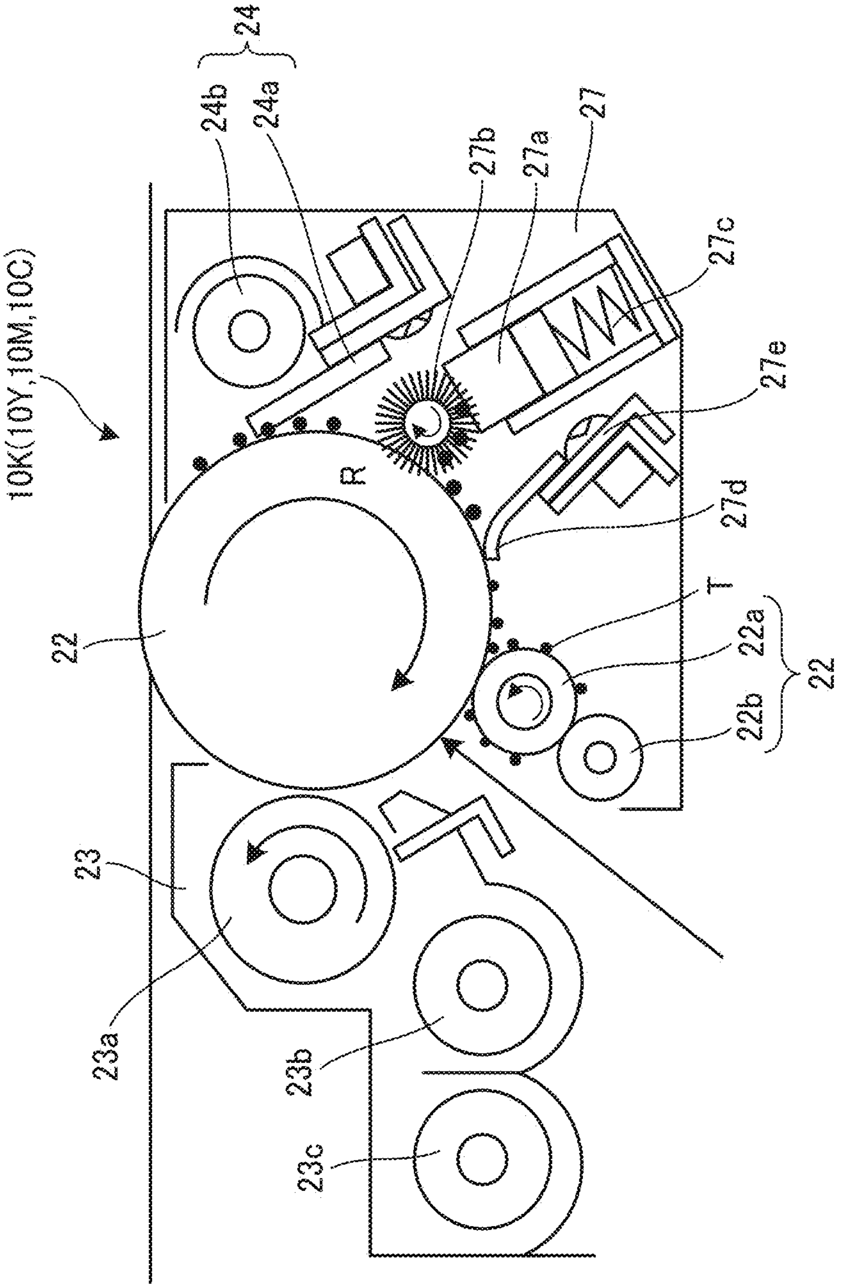
FIG. 3 is a schematic view of a process cartridge according to an embodiment of the present disclosure.

FIG. 1 is a schematic view of an image forming apparatus according to an embodiment of the present disclosure. FIGS. 2 and 3 are schematic views of a process cartridge according to an embodiment of the present disclosure.

The image forming apparatus of the present embodiment includes at least a latent image bearer that bears a latent image, a charger that charges a surface of the latent image bearer by a charging member formed of a rotator, and a cleaning device including a cleaner that contacts a surface of the charging member to clean the surface of the charging member. The cleaner is a roller. The roller has a foam layer that contacts a surface of the rotator. A coefficient of static friction of a surface of the foam layer measured by an Euler belt method is 0.5 or more.

The process cartridge of the present embodiment includes at least a latent image bearer that bears a latent image, a charger that charges a surface of the latent image bearer by a charging member formed of a rotator, and a cleaning device including a cleaner that contacts a surface of the charging member to clean the surface of the charging member. The process cartridge is detachably attached to a body of an image forming apparatus. The cleaner is a roller. The roller has a foam layer that contacts a surface of the rotator. A coefficient of static friction of a surface of the foam layer measured by an Euler belt method is 0.5 or more.

The image forming apparatus 1 illustrated in FIG. 1 is a tandem-type image forming apparatus including the four process cartridges. The image forming apparatus 1 includes an image forming device 10, an optical writing device 11, a sheet feeding device 12, a secondary transfer device 13, a fixing device 14, a sheet ejecting device 15, and a sheet ejection tray 16. The image forming device 10 includes process cartridges 10Y, 10M, 10C, and 10K as image forming units of respective colors of Y (yellow), M (magenta), C (cyan), and K (black). Photoconductors 21 as latent image bearers of the process cartridges 10Y, 10M, 10C, and 10K contact an intermediate transfer belt 17. Toner images formed on the photoconductors 21 are primarily transferred by a primary transfer device 18. Hereinafter, the colors may be represented by Y, M, C, and K.

FIG. 2 is a schematic view of the process cartridge 10K for black. The process cartridge 10K includes the photoconductor 21 having a drum shape, and a charging device 22, a developing device 23, a photoconductor cleaning device 24, and a charge elimination device disposed along an outer circumference of the photoconductor 21. An optical writer 26 to which a laser beam for optical writing is emitted from the optical writing device 11 is set between the charging device 22 and the developing device 23. The charge elimination device is disposed in a region 25 between the photoconductor cleaning device 24 and the charging device 22.

The charging device 22 includes a charging roller 22*a* disposed with a clearance (gap) from the photoconductor 21, and a cleaning device according to the present embodiment that removes stain on the charging roller 22*a*. The cleaning device includes a cleaner 22*b* that is a roller. The developing device 23 includes a developing roller 23*a*, a stirring roller 23*b*, and a stirring roller 23*c*.

In the image forming apparatus 1, the optical writing device 11 writes laser light modulated based on image data to be formed on the photoconductor 21, which is a latent image bearer having a surface charged to a specified potential by the charging device 22, to form a latent image on the photoconductor 21. The electrostatic latent image is developed by the developing device 23 to form a toner image. The toner image is primarily transferred onto the intermediate transfer belt 17 by the primary transfer device 18. Each of the process cartridges 10Y, 10M, and 10C as image forming units for the colors other than black also performs primary transfer, so that four color toner images are superimposed on the intermediate transfer belt 17 to form a full-color toner image.

The secondary transfer device 13 collectively transfers the full-color toner image formed on the intermediate transfer belt 17 onto a sheet fed from any one of sheet trays 12*a* in the sheet feeding device 12. A registration roller pair 12*b* feeds the sheet to a vertical conveyance passage 12*c* at a timing at which the sheet can receive the full-color toner image on the intermediate transfer belt 17. The fixing device 14 applies heat and pressure to the full-color toner image transferred onto the sheet to fix the full-color toner image onto the sheet, and the sheet ejecting device 15 ejects the sheet to the sheet ejection tray 16.

After a toner image is primarily transferred onto the photoconductor 21, the photoconductor cleaning device 24 cleans the surface of the photoconductor 21 to remove residual toner T, which is not transferred from the photoconductor 21 to the intermediate transfer belt 17 and remains on the surface of the photoconductor 21, from the surface of the photoconductor 21. Then, the charge elimination device discharges the surface of the photoconductor 21. The photoconductor cleaning device 24 includes a cleaning blade 24*a* and a waste-toner conveyor 24*b*. The cleaning blade 24*a* scrapes off the residual toner T on the photoconductor 21. The waste-toner conveyor 24*b* conveys and collects the scraped residual toner T. The intermediate transfer belt 17 is stretched between a driving roller and a driven roller. A belt cleaner 17*a* for cleaning the intermediate transfer belt 17 is disposed with respect to the driving roller.

Each of the process cartridges 10Y, 10M, and 10C for yellow, magenta, and cyan has similar configuration as the process cartridge 10K for black.

FIG. 3 is a schematic view of another example of the process cartridge 10K for black. A lubricant application device 27 is disposed in the process cartridge 10K illustrated in FIG. 3 to enhance the cleanability of cleaning the photoconductor 21 and the transferability of transferring an image from the photoconductor 21. The lubricant application device 27 is disposed downstream from the photoconductor cleaning device 24 in a rotation direction R of the photoconductor 21 to stabilize lubricant application. The lubricant application device 27 is disposed downstream from the photoconductor cleaning device 24 so that the lubricant is applied to the surface of the photoconductor 21 after residual toner is removed. As a result, the lubricant application device 27 can stably apply the lubricant to the surface of the photoconductor 21.

The lubricant application device 27 includes a lubricant 27*a*, a brush roller 27*b*, a compression spring 27*c*, and an application blade 27*d*. The lubricant application device 27 is disposed downstream from the photoconductor cleaning device 24 in the rotation direction R of the photoconductor 21. The lubricant 27*a* is solid. The brush roller 27*b* contacts the lubricant 27*a* and the photoconductor 21 to rotate, and thus scrapes the lubricant 27*a* to apply the lubricant 27*a* to the photoconductor 21. The lubricant 27*a* is pressed against the brush roller 27*b* by the compression spring 27*c* to maintain contact with the brush roller 27*b*.

Figure 4:
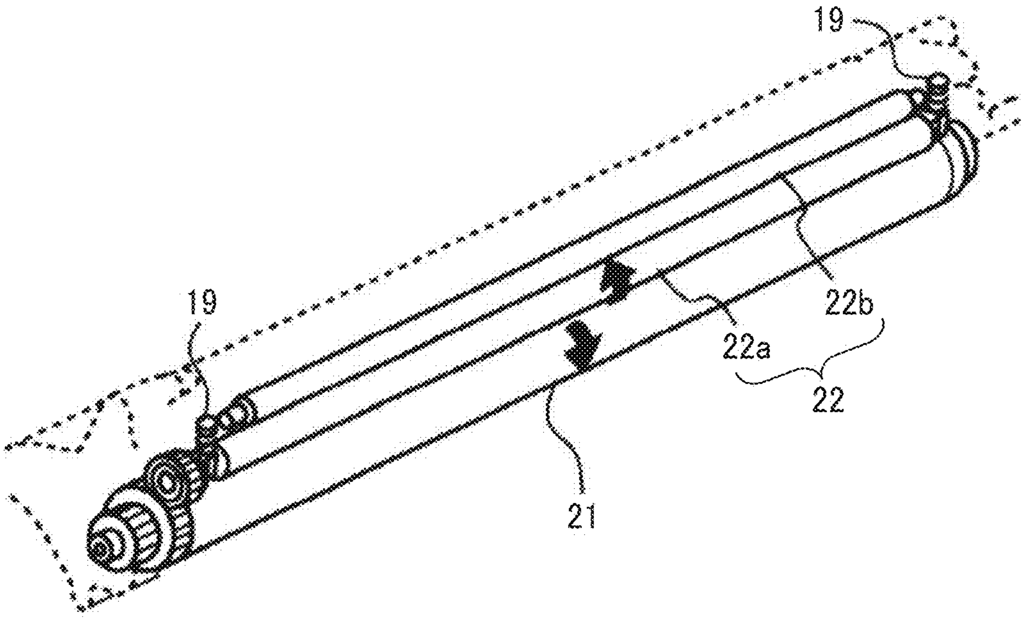
FIG. 4 is a perspective view of an arrangement of a photoconductor, a charging roller, and a cleaner (roller)

FIG. 4 is a perspective view of an arrangement of the charging device 22 and the photoconductor 21. The charging device 22 includes the charging roller 22*a* and the cleaner 22*b*. The charging roller 22*a* as a charging member is disposed to face the photoconductor 21. The cleaner 22*b* is disposed to contact a surface of the charging roller 22*a* on the side opposite the side on which the charging roller 22*a* faces the photoconductor 21. The charging roller 22*a* is provided with pressure springs 19 as biasing members that bias both ends of the charging roller 22*a* toward the photoconductor 21.

A rotator as a cleaning target of the cleaner 22*b* according to the present embodiment is, for example, a charging member (charging roller 22*a*). The charging roller 22*a* is formed of a conductive member and a conductive supporting member that rotatably supports the conductive member. As the conductive member, a known material can be used, but a material to which foreign substance is less likely to adhere to the surface thereof and from which the adhered foreign substance can be efficiently removed is preferable, and for example, a hard resin member is preferable. The charging roller 22*a* that includes the conductive member made of a hard resin member is combined with the cleaning device according to the present embodiment, so that a significant effect of removing foreign substance and reducing the occurrence of an abnormal image can be obtained.

Figure 5A:
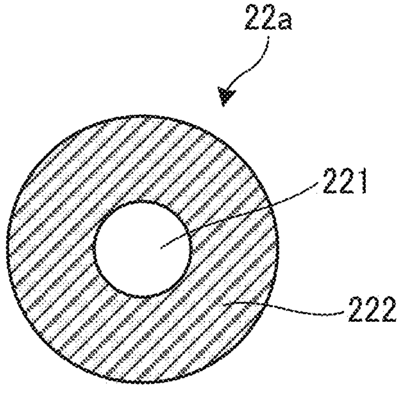
FIG. 5A is a cross-sectional view of a charging roller.

FIG. 5A is a cross-sectional view of the charging roller 22*a*. The charging roller 22*a* includes a core metal 221 as a conductive support member having a cylindrical shape and a resistance adjustment layer 222 as a conductive member formed at a uniform thickness on an outer circumferential surface of the core metal 221. The resistance adjustment layer 222 is formed of a resin composition formed on the circumferential surface of the core metal 221 by, for example, extrusion molding or injection molding. The resistance adjustment layer 222, which is a conductive member, preferably has a JIS-D hardness of 45 degrees or more in order to prevent the clearance between the photoconductor 21 and the charging roller 22*a* from changing due to deformation over time.

The material used for the resistance adjustment layer 222 may be a thermoplastic resin and is not limited to any particular material as long as the JIS-D hardness of 45 degrees or more can be maintained after molding. However, a material that is easily molded is preferable, and examples thereof include general purpose resins such as polyethylene (PE), polypropylene (PP), polymethyl methacrylate (PMMA), polystyrene (PS), and copolymers thereof (e.g., acrylonitrile styrene (AS) and acrylonitrile butadiene styrene (ABS)).

The resistance adjustment layer 222 is formed of a thermoplastic resin composition in which a polymeric ion conductive agent is dispersed. The volume resistivity of the resistance adjustment layer 222 is preferably $10^6$ to $10^9$ Ω·cm. This is because when the volume resistivity exceeds $10^9$ Ω·cm, the charge amount is insufficient, and the photoconductor 21 is unlikely to obtain a sufficient charge potential for obtaining an image without unevenness. On the other hand, when the volume resistivity is smaller than $10^6$ Ω·cm, leakage to the entire photoconductor 21 occurs.

The polymeric ion conductive agent to be dispersed in the thermoplastic resin is preferably a compound that has a volume resistivity of about $10^6$ to $10^{10}$ Ω·cm as a single substance and easily lowers the resistance of the resin, and contains, for example, a polyether ester amide component. In this case, the amount of the polymeric ion conductive agent to be blended is preferably set to a ratio of 30 to 70 parts by weight with respect to 100 parts by weight of the base material in order to set the volume resistivity of the resistance adjustment layer 222 to a desired value. On the other hand, a compound containing a quaternary ammonium salt group can also be used as the polymeric ion conductive agent, and examples of the resistance adjustment layer include a polyolefin containing a quaternary ammonium salt group. In this case, the amount of the polymeric ion conductive agent to be blended is preferably set to a ratio of 10 to 40 parts by weight with respect to 100 parts by weight of the base material in order to set the volume resistivity of the resistance adjustment layer 222 to a desired value.

The polymeric ion conductive agent can be easily dispersed in the thermoplastic resin by using, for example, a twin-screw kneader. Since the ion conductive material is uniformly dispersed at a molecular level in the matrix polymer, the resistance adjustment layer 222 does not have a variation in volume resistivity due to poor dispersion of the conductive substance, which is observed in a resistance adjustment layer in which a conductive pigment is dispersed. The ion conductive material that is a polymer compound is uniformly dispersed and fixed in the matrix polymer, and bleed-out is unlikely to occur.

The charging roller 22*a* is coupled with a power supply, and a specified voltage is applied to the charging roller 22*a*. The specified voltage may be a direct current (DC) voltage alone. However, the specified voltage is preferably obtained by superimposing an alternating current (AC) voltage on the DC voltage. The AC voltage is applied to more uniformly charge the surface of the photoconductor 21. The charging roller 22*a* may contact the photoconductor 21. However, in the present embodiment, the charging roller 22*a* is preferably disposed with a minute clearance with respect to the photoconductor 21. The minute clearance can be set by winding spacers around non-image forming regions at both ends of the charging roller 22*a* and contacting the surfaces of the spacers against the surface of the photoconductor 21.

Figure 5B:
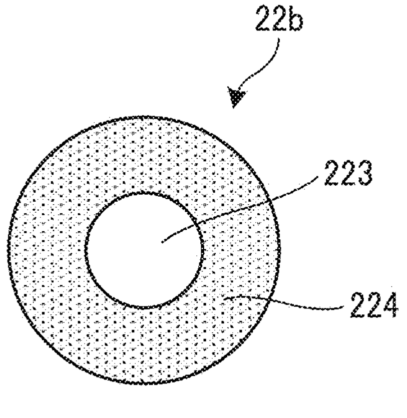
FIG. 5B is a cross-sectional view of a cleaner.

FIG. 5B is a cross-sectional view of the cleaner 22*b*. The cleaner 22*b* is a roller and includes at least a foam layer 224 that contacts the surface of the rotator as a cleaning target and a core 223 (shaft) that rotatably supports the foam layer 224. The cleaning device may include other components as necessary in addition to the cleaner 22*b*.

The material of the core 223 is not limited to any particular material and may be appropriately selected according to the purpose. Examples of the material of the core 223 include, but not limited to, plastic and metal. Examples of the resin include, but not limited to, an epoxy resin and a phenol resin. Examples of the metal include, but not limited to, iron, aluminum, and stainless steel.

The foam layer 224 is formed on an outer circumference of the core 223. In the cleaning device of the present embodiment, the coefficient of static friction of the surface of the foam layer 224 is 0.5 or more by the Euler belt method.

Figure 6:
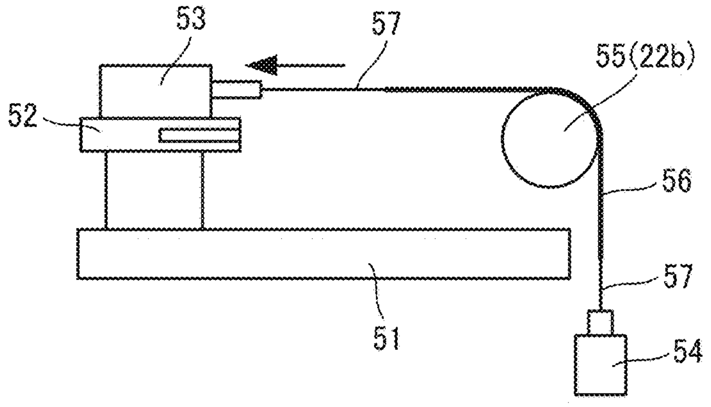
FIG. 6 is a diagram illustrating an Euler-belt-type measuring apparatus.

A description is given of a method for measuring the coefficient of static friction of the surface of the foam layer 224 by the Euler belt method with reference to FIG. 6. FIG. 6 is a schematic diagram of an Euler-belt-type measuring apparatus. The measuring apparatus includes a substrate 51, a linear motor 52, a digital push-pull gauge 53, a weight 54, a measured object 55 (cleaner 22*b*), a belt 56 made of paper, and threads 57. The measured object 55 is fixed not to be rotated in the vicinity of one end of the substrate 51, which is horizontally disposed, and the belt 56 is placed on the measured object 55. The belt 56 contacts a portion of one-fourth of the outer circumference of the measured object 55. The weight 54 of a load W (e.g., 100 g weight) is hung on one thread 57, and the other thread 57 is coupled with the digital push-pull gauge 53. In this state, the linear motor 52 is operated to pull the belt 56 via the thread 57, and the value of the digital push-pull gauge 53 is read when the weight 54 starts to move. When the value at this time is F (N), the coefficient of static friction u is calculated by the following equation. $\mu=(2/\pi)\times[\ln(F/W)]$ ($\mu$: Coefficient of static friction, $\pi$: Pi, F: Read value of digital push-pull gauge, and W: Load)

Figure 7:
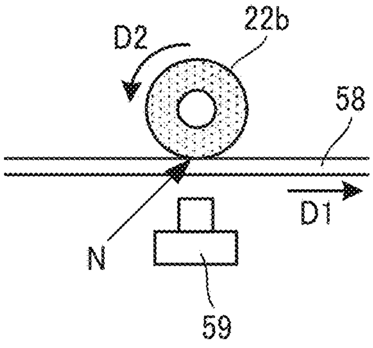
FIG. 7 is a diagram of an observation device that observes the state of cells of a foam.

A description is given of the reason why the coefficient of static friction measured by the Euler belt method can be an index indicating the cleanability based on the experimental result using an observation apparatus of FIG. 7. FIG. 7 is a schematic view of the observation apparatus, which includes a transparent glass plate 58 and a high-speed camera 59. The high-speed camera 59 photographs a contact state between the cleaner 22*b* and the glass plate 58 in a nip portion N. In FIG. 7, the reference sign D1 indicates the moving direction of the glass plate 58, and the reference sign D2 indicates the direction in which the cleaner 22*b* that is contacted with the glass plate 58 is driven to rotate by the glass plate 58 (rotates in conjunction with the movement of the glass plate 58). Multiple samples of the cleaner 22*b* having different cleanabilities with respect to the charging roller 22*a* were prepared, and the relation between the samples of the cleaner 22*b* and the observation results was analyzed.

When the contact state between the cleaner 22*b* having a roller shape and the glass plate 58 at the nip portion was observed by the observation apparatus of FIG. 7, it was observed that the sample having excellent cleanability for the surface of the charging roller 22*a* was actively moving in the nip portion in conjunction with the rotation of the charging roller 22*a* while being in close contact with the glass plate 58.

It was also observed that the higher the tackiness (adhesiveness) of the surface of the cleaner 22*b*, the more active the movement of the cells in the foam forming the surface of the cleaner 22*b*. It is considered that the more active the movement of the cells, the more the adhesive material on the surface of the charging roller 22*a* can be removed by more random movements. As a result, the cleanability is enhanced, and at the same time, stain is less likely to accumulate on the same circumferential region. Thus, the occurrence of streaky stain can be reduced.

Figures 8A, 8B:
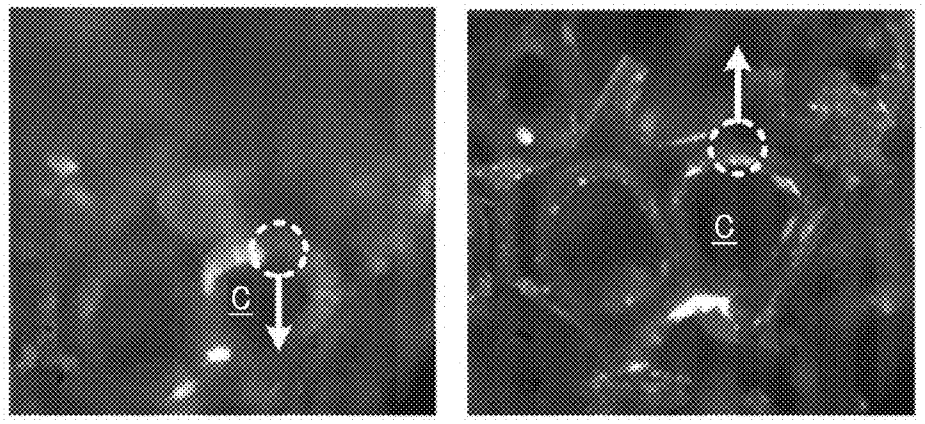
FIGS. 8A and 8B are photographs illustrating observation results by the observation device of FIG. 7.

FIGS. 8A and 8B are photographs illustrating an observation result by the observation apparatus of FIG. 7 and illustrating the cleaner 22*b* that is driven to rotate with the movement of the glass plate 58 in the order of FIGS. 8A and 8B. The portions surrounded by the circles of the broken lines in FIGS. 8A and 8B are part of a frame that forms cells in the foam constituting the foam layer of the cleaner 22*b* and indicate the same portion of the same cell (reference sign C).

At the time point illustrated in FIG. 8A, the frame forming the cell adheres to (is caught by) the surface, and the cell is compressed. At the time point illustrated in FIG. 8B, the frame forming the cell is separated from the surface, and the cell is expanded. Such expansion and contraction of the cells are more active as the tackiness (adhesiveness) of the surface of the cleaner 22*b* is higher. The tackiness described above represents the property of being caught by a flat surface, the Euler belt method, which measures the tackiness by sliding a belt made of paper, can measure this property in principle. The superiority or inferiority (good or bad) of the cleanability can be expressed by the coefficient of static friction.

As a result of detailed studies of the examples described below, it has been found that, when the value of the coefficient of static friction by the Euler belt method is 0.5 or more, preferable cleanability can also be obtained for the actual charging roller 22*a*. The upper limit of the coefficient of static friction is not limited, and the higher the coefficient of static friction, the better the cleanability is obtained. However, the value that can be achieved by a resin foaming member is generally 1.5 or less. In the cleaning device according to the present embodiment, the coefficient of static friction of the surface of the foam layer 224 is preferably 0.5 or more, and more preferably 0.6 or more, by the Euler belt method. In the cleaning device according to present embodiment, the coefficient of static friction of the surface of the foam layer 224 is preferably 0.5 or more and 0.79 or less by the Euler belt method.

The average thickness of the foam layer 224 is not limited to any particular thickness and may be appropriately selected depending on the purpose. The average thickness is preferably 1 to 4 mm. If the average thickness of the foam layer 224 is less than 1 mm, the foam layer 224 is likely to receive the influence of the core 223 (shaft). If the average thickness exceeds 4 mm, the size of the component increases and the flexibility in layout decreases. The “average thickness” is an average value of values obtained by measuring the thickness of the foam layer 224 at any three points.

Figure 9A:
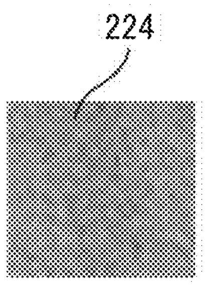
FIG. 9A is a photograph of a closed-cell foam.
Figure 9B:
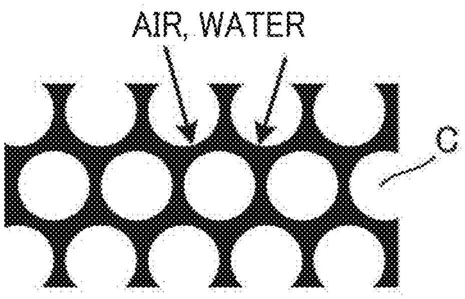
FIG. 9B is a diagram illustrating cells of the closed-cell foam of FIG. 9A.
Figure 10A:
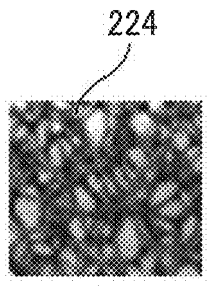
FIG. 10A is a photograph of an open-cell foam.
Figure 10B:
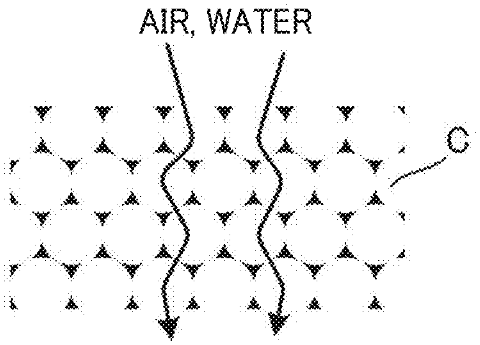
FIG. 10B is a diagram illustrating cells of the open-cell foam of FIG. 10A.

Examples of the structure of the foam forming the foam layer 224 include a form having closed cells (see FIGS. 9A and 9B) and a form having open cells (see FIGS. 10A and 10B). The open cell has a small compressive residual strain and is likely to return to the original shape even after compression, and thus is unlikely to be deformed even in long-term use. Accordingly, an aspect including the open-cell-type cells is preferable.

FIG. 9A is a photograph of a foam having closed cells, and FIG. 9B is a cross-sectional view of the foam having closed cells. The foam having the closed cells has a structure in which cells C (holes) are independent of each other as illustrated in FIG. 9B and that is impermeable to air and water. FIG. 10A is a photograph of a foam having open cells, and FIG. 10B is a cross-sectional view of the foam having open cells. As illustrated in FIG. 10B, the foam having the open cells has a structure in which adjacent cells C communicate with each other and that is permeable to air and water. Accordingly, the open-cell type is excellent in the action of sending the stain adhering on the surface of the cleaning target to the inside of the foam, and the stain is unlikely to be accumulated on the surface of the cleaning target. Thus, there is also a merit that the cleanability can be maintained for a long period of time.

The number of cells included in the foam forming the foam layer 224 is not limited to any particular number and may be appropriately selected depending on the purpose. The number of cells is preferably 30 cells/inch to 150 cells/inch and is more preferably 50 cells/inch to 100 cells/inch. When the number of cells is less than 50 cells/inch, the area of the cells that contact the cleaning target is too small, and thus the cleanability may not be sufficiently obtained. When the number of the toner particles is more than 100 particles/inch, the removed adhesive material is likely to remain on the surface of the cleaning member, and thus the cleanability may deteriorate over time.

Figure 11:
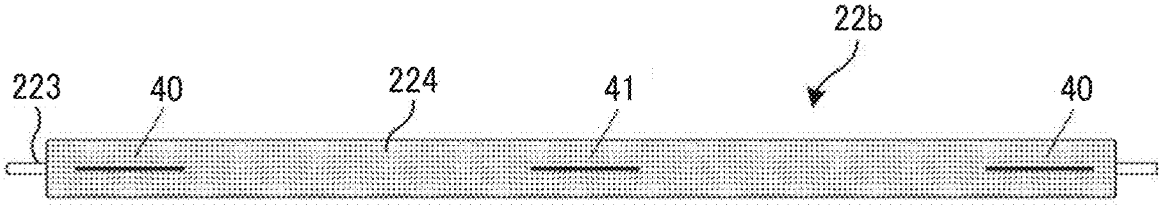
FIG. 11 is a front view of a cleaner illustrating the measurement points of the number of cells.

The number of cells in the present embodiment is an average value of values measured by the following method. FIG. 11 is a front view of the cleaner 22*b*, which is a measurement target, of the present embodiment. Any three measurement points are selected from portions 40 in the vicinities of both ends and a central portion 41 in the axial direction on the surface of the foam layer 224 of the cleaner 22*b* in FIG. 11. Next, two different points in the circumferential direction corresponding to each measurement points are further selected, and a total of nine measurement points are determined.

Figure 12:
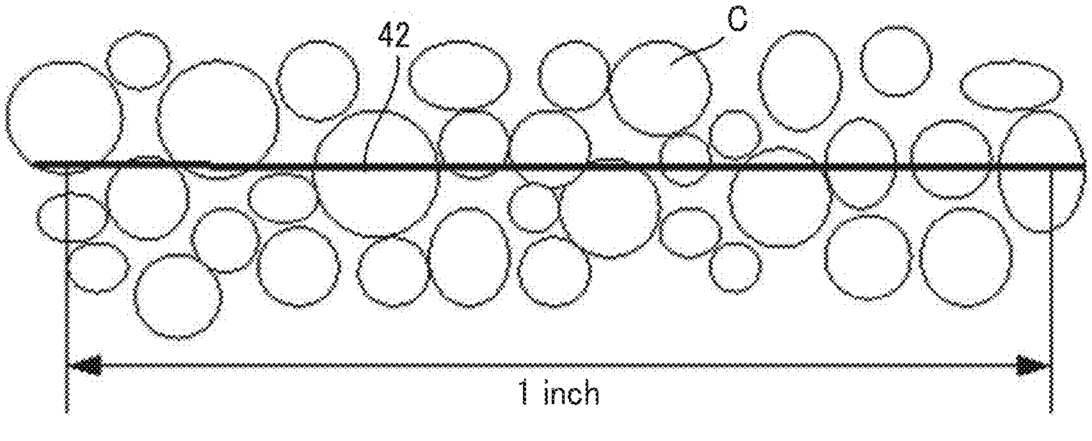
FIG. 12 is a diagram illustrating a method of measuring the number of cells.

Each of the determined measurement points is photographed using a microscope, and the number of cells is measured from the obtained image. FIG. 12 is a diagram illustrating a method of measuring the number of cells. As illustrated in FIG. 12, a line 42 is drawn in the center of the image, and the number of cells C present in the range corresponding to the actual size of 1 inch (approximately 25 mm) is counted. The measurements are performed for nine measurement points, and the average value is obtained. Note that cells that overlap on the line 42 of one inch are counted even if the cells partly overlap on the line 42. For example, the number of cells to be counted in the example illustrated in FIG. 12 is 12.

The hardness of the foam forming the foam layer 224 is not limited to any particular hardness and may be appropriately selected depending on the purpose. The hardness is preferably from 50 to 600 N, more preferably from 100 to 500 N. If the hardness of the foam is less than 100 N, the wall surface forming the cells is not strong enough and the effect by cleaning is slightly reduced. On the other hand, if the hardness of the foam exceeds 500 N, the polishing force of the individual cells increases and the surface of the cleaning target may be unevenly worn. The hardness of the foam is an average value of values measured at any three points on the surface of the foam layer in accordance with JIS K 6400.

The coefficient of static friction of the surface of the foam layer, the form of the foam (closed-cell type/open-cell type), the number of cells contained in the foam, and the hardness of the foam can be controlled by appropriately adjusting, for example, the raw materials used in the production of the foam, the type and amount of the foaming agent, and the reaction conditions during the production. The foam is preferably a resin foam, and particularly preferably a polyurethane foam.

EXAMPLES

In a charging device (corresponding to the charging device 22 in FIG. 3) in a process cartridge (a photoconductor unit of the copier "RICOH IM C5000" manufactured by Ricoh Company, Ltd.) having a similar configuration as the process cartridge in FIG. 3, a cleaner (corresponding to the cleaner 22*b* in FIG. 3) having a foam layer formed of foams A to O illustrated in Table 1 below was produced and mounted as a cleaning device. The dimensions of the cleaner were the same as the dimensions of a standard product of the process cartridge. The materials, the cell forms (closed-cell type/open-cell type), the coefficient of static friction (μ) of the surface, the hardness (N), and the number of cells (cells/inch) of the foams A to O are also illustrated in Table 1. The conductive member of the charging roller (corresponding to the charging roller 22*a* in FIG. 3) is formed of a hard plastic material containing ABS as a main component.

TABLE 1

| FOAM | MATERIAL | TYPE OF CELLS | COEFFICIENT OF STATIC FRICTION (μ) | HARDNESS (N) | NUMBER OF CELLS (CELLS/INCH) |
|---|---|---|---|---|---|
| FOAM A | POLYURETHANE | OPEN CELL | 0.61 | 300 | 65 |
| FOAM B | POLYURETHANE | OPEN CELL | 0.79 | 240 | 75 |
| FOAM C | POLYURETHANE | OPEN CELL | 0.52 | 300 | 65 |
| FOAM D | POLYURETHANE | OPEN CELL | 0.61 | 300 | 55 |
| FOAM E | POLYURETHANE | OPEN CELL | 0.61 | 300 | 100 |
| FOAM F | POLYURETHANE | OPEN CELL | 0.61 | 180 | 65 |
| FOAM G | POLYURETHANE | OPEN CELL | 0.61 | 450 | 60 |
| FOAM H | POLYURETHANE | OPEN CELL | 0.61 | 300 | 45 |
| FOAM I | POLYURETHANE | OPEN CELL | 0.61 | 300 | 110 |
| FOAM J | POLYURETHANE | OPEN CELL | 0.61 | 130 | 70 |
| FOAM K | POLYURETHANE | OPEN CELL | 0.61 | 520 | 60 |
| FOAM L | POLYOLEFIN | OPEN CELL | 0.61 | 300 | 65 |
| FOAM M | POLYURETHANE | CLOSED CELL | 0.61 | 300 | 65 |
| FOAM N | POLYURETHANE | OPEN CELL | 0.47 | 300 | 65 |
| FOAM O | POLYURETHANE | OPEN CELL | 0.41 | 300 | 65 |

First Example

A process cartridge in which a cleaner having a foam layer formed of the foam A was used as a cleaning device for a charging device was mounted on a black (K) station of an image forming apparatus (RICOH IM C5000), and evaluation was performed by an actual machine as follows. In each case, the black station was used alone.

In a cleaning process of the charging roller, the larger the consumption of the lubricant in the process cartridge, the greater the risk of the cleaning failure, the experiment was performed by setting the pressing force of a compression spring (corresponding to the compression spring 27*c* in FIG.

3) of a lubricant application device (corresponding to the lubricant application device 27 in FIG. 3) to be twice as large as the normal pressing force to increase the consumption of the lubricant. As for the printing conditions, a black vertical band chart was continuously printed (fed) on 150,000 sheets of A4 horizontal under a low temperature and low humidity environment (10° C., 15% relative humidity (RH)), and the occurrence of the cleaning failure was checked.

The occurrence of the cleaning failure was determined by feeding a blank sheet every 50,000 sheets and checking whether a vertical black streak (abnormal image) caused by stain of the charging roller was found on the image. When a vertical black streak was generated on the image, the process cartridge was taken out, and the cleaning failure was determined by checking that a streak-like stain was found on the charging roller at a portion corresponding to the vertical black streak on the image. The degree of the vertical black streak was evaluated, and the cleanability was ranked into five levels. The best level was set to five, the acceptable level in practical use was set to three or more, and the unacceptable level in practical use was set to two or less. The results are illustrated in Table 2.

Second to Thirteenth Examples

The evaluation was performed in the same manner as in the first example except that the foam forming the foam layer of the cleaner was changed to the foams B to M. The results are illustrated in Table 2.

Fourteenth Example

The evaluation was performed in the same manner as in the first example except that the conductive member of the charging roller as a cleaning target was a rubber roller containing epichlorohydrin rubber as a main component. The electrical characteristics were adjusted so that elements other than the surface properties of the charging roller do not affect the evaluation results. The results are illustrated in Table 2.

First and Second Comparative Examples

The evaluation was performed in the same manner as in the first example except that the foam forming the foam layer of the cleaner was changed to the foam N and the foam O. The results are illustrated in Table 2.

Third and Fourth Comparative Examples

The evaluation was performed in the same manner as in the fourteenth example except that the foam forming the foam layer of the cleaner was changed to the foam N and the foam O. The results are illustrated in Table 2.

TABLE 2

| | | CONDUCTIVE | RANK OF CLEANABILITY | | |
|---|---|---|---|---|---|
| | FOAM OF CLEANER | MEMBER OF CHARGING ROLLER | AFTER 50,000 SHEETS | AFTER 100,000 SHEETS | AFTER 150,000 SHEETS |
| EXAMPLE 1 | FOAM A | HARD RESIN | 5 | 5 | 5 |
| EXAMPLE 2 | FOAM B | HARD RESIN | 5 | 5 | 5 |
| EXAMPLE 3 | FOAM C | HARD RESIN | 5 | 5 | 5 |
| EXAMPLE 4 | FOAM D | HARD RESIN | 5 | 5 | 4 |
| EXAMPLE 5 | FOAM E | HARD RESIN | 5 | 5 | 4 |
| EXAMPLE 6 | FOAM F | HARD RESIN | 5 | 5 | 4 |
| EXAMPLE 7 | FOAM G | HARD RESIN | 5 | 5 | 4 |
| EXAMPLE 8 | FOAM H | HARD RESIN | 5 | 4 | 3 |
| EXAMPLE 9 | FOAM I | HARD RESIN | 5 | 5 | 3 |
| EXAMPLE 10 | FOAM J | HARD RESIN | 5 | 4 | 3 |
| EXAMPLE 11 | FOAM K | HARD RESIN | 5 | 5 | 3 |
| EXAMPLE 12 | FOAM L | HARD RESIN | 5 | 4 | 3 |
| EXAMPLE 13 | FOAM M | HARD RESIN | 5 | 5 | 3 |
| EXAMPLE 14 | FOAM A | RUBBER | 5 | 4 | 4 |
| COMPARATIVE EXAMPLE 1 | FOAM N | HARD RESIN | 3 | 2 | 2 |
| COMPARATIVE EXAMPLE 2 | FOAM O | HARD RESIN | 3 | 2 | 1 |
| COMPARATIVE EXAMPLE 3 | FOAM N | RUBBER | 4 | 3 | 2 |
| COMPARATIVE EXAMPLE 4 | FOAM O | RUBBER | 4 | 3 | 2 |

From the above-described results, it was indicated that the cleaning device according to the present embodiment, the process cartridge including the cleaning device, and the image forming apparatus including the process cartridge can uniformly and efficiently remove the stain attached to the charging roller and can reduce the occurrence of an abnormal image mainly including the vertical black streak for a long period of time. On the other hand, in a comparative example using a cleaner having a coefficient of static friction of the surface of a foam layer measured by the Euler belt method of less than 0.5, the occurrence of an abnormal image was observed at an early stage.

In the above-described examples, the charging roller was evaluated as a cleaning target, but the cleaning target of the cleaning device according to the present embodiment is not limited as long as the cleaning target is a rotator that can contact the surface of the cleaning target to clean the surface of the cleaning target. The cleaning device can also be applied to cleaning of the surface of a belt such as a transfer belt, cleaning of the surface of a photoconductor drum, and cleaning of the surface of a roller such as a conveying roller.

In recent years, demands for high image quality and high definition of images have increased, and toners having a small particle diameter and a spherical shape have been used in a developing step. By using such a toner, the toner is caused to adhere to the electrostatic latent image in a dense manner. However, such a toner having a small particle diameter and a spherical shape is likely to pass through a cleaning blade in a cleaning step, and thus cleaning failure is likely to occur.

On the other hand, many attempts have been made to enhance the cleaning property by applying a lubricant such as zinc stearate to the surface of the image bearer to reduce the friction coefficient of the surface and reduce the frictional force acting between the surface of the image bearer and a member in contact with the surface. However, if there is powder of the lubricant that cannot be sufficiently formed into a film, the powder passes through the cleaning blade and may adhere to the charging roller similarly to the toner.

When the toner or the lubricant adheres to the charging roller, the resistance of the surface of the charging roller locally increases. Accordingly, the charging ability of the charging roller is partially reduced in the axial direction, and the image bearing member may not be uniformly charged. As a result, vertical black streaks (abnormal image) are likely to appear in an image particularly in a low-temperature and low-humidity environment.

To deal with such a failure, as a cleaning unit for a charging roller, a cleaning roller provided with a resin foam has been proposed. In a cleaning member using a foam on the outer periphery, the same portion in the axial direction continuously contacts a rotator to be cleaned, and thus the contamination is likely to be accumulated only in the portion.

The occurrence of an abnormal image due to the adhesion of foreign substance to a rotating member such as a charging roller or a transfer belt is fundamentally caused by the occurrence of uneven resistance due to a large local difference in the amount of foreign substance adhered. In order to prevent such a failure, it is preferable to efficiently remove the foreign substance on the rotator to prevent the accumulation of the foreign substance and to uniformly remove the foreign substance.

As described above, according to at least one embodiment of the present disclosure, a cleaning device can uniformly and efficiently remove contamination adhering to a rotator and reducing the occurrence of an abnormal image mainly including a vertical black streak for a long period of time.

A description is given below of some aspects according to the present disclosure.

First Aspect

A cleaning device includes a cleaner (e.g., the cleaner **22*b*) that contacts a surface of a rotator (e.g., the charging roller 22*a*) to clean the surface of the rotator. The cleaner is a roller and has a foam layer (e.g., the foam layer 224**) that contacts the surface of the rotator. A coefficient of static friction of a surface of the foam layer measured by an Euler belt method is 0.5 or more.

Second Aspect

In the cleaning device according to the first aspect, the foam of the foam layer (e.g., the foam layer 224) has a plurality of cells. The number of the plurality of cells per inch in the foam layer is 30 to 150.

Third Aspect

In the cleaning device according to the first aspect, the foam of the foam layer (e.g., the foam layer 224) has a plurality of cells. The number of the plurality of cells per inch in the foam layer is 50 to 100.

Fourth Aspect

In the cleaning device according to the first or second aspect, the hardness of the foam of the foam layer (e.g., the foam layer 224) is 100 to 500 N.

Fifth Aspect

In the cleaning device according to any one of the first to fourth aspects, the foam of the foam layer (e.g., the foam layer 224) is made of foamed polyurethane.

Sixth Aspect

In the cleaning device according to any one of the first to fifth aspects, the foam has a plurality of adjacent cells that communicate with each other.

Seventh Aspect

In the cleaning device according to any one of the first to sixth aspects, the rotator is a charging member. The charging member is a charging roller (e.g., the charging roller **22*a*) that includes a conductive member (e.g., the resistance adjustment layer 222) made of a hard resin member and a conductive support member (e.g., the core metal 221**) that rotatably supports the conductive member.

Eighth Aspect

In the cleaning device according to any one of the first to seventh aspects, the coefficient of static friction of the surface of the foam layer (e.g., the foam layer 224) measured by the Euler belt method is 0.5 or more and 1.5 or less.

Ninth Aspect

In the cleaning device according to any one of the first to seventh aspects, the coefficient of static friction of the surface of the foam layer (e.g., the foam layer 224) measured by the Euler belt method is 0.5 or more and 0.79 or less.

Tenth Aspect

An image forming apparatus (e.g., the image forming apparatus 1) includes a latent image bearer (e.g., the photoconductor 21), a charger, a developing device (e.g., the developing device 23), and a cleaning device (e.g., the photoconductor cleaning device 24). The latent image bearer bears a latent image. The charger charges a surface of the latent image bearer with a charging member formed of a rotator. The developing device develops the latent image to form a toner image. The cleaning device includes a cleaner (e.g., the cleaner **22*b*) that contacts a surface of the charging member to clean the surface of the charging member. The cleaner is a roller. The roller has a foam layer (e.g., the foam layer 224**) that contacts a surface of the rotator. A coefficient of static friction of a surface of the foam layer measured by an Euler belt method is 0.5 or more.

Eleventh Aspect

In the image forming apparatus (e.g., the image forming apparatus 1) according to the tenth aspect, the coefficient of static friction of the surface of the foam layer (e.g., the foam layer 224) measured by the Euler belt method is 0.5 or more to 1.5 or less.

Twelfth Aspect

In the image forming apparatus (e.g., the image forming apparatus 1) according to the tenth aspect, the coefficient of static friction of the surface of the foam layer (e.g., the foam layer 224) measured by the Euler belt method is 0.5 or more and 0.79 or less.

Thirteenth Aspect

A process cartridge (e.g., the process cartridge 10Y, 10M, 10C, 10K) detachably attachable to a body of an image forming apparatus (e.g., the image forming apparatus 1) includes a latent image bearer (e.g., the photoconductor 21), a charger, and a cleaning device (e.g., the photoconductor cleaning device 24). The latent image bearer bears a latent image. The charger charges a surface of the latent image bearer with a charging member (e.g., the charging roller 22*a*) formed of a rotator. The cleaning device includes a cleaner (e.g., the cleaner 22*b*) that contacts a surface of the charging member to clean the surface of the charging member. The cleaner is a roller. The roller has a foam layer (e.g., the foam layer 224) that contacts a surface of the rotator. A coefficient of static friction of a surface of the foam layer measured by an Euler belt method is 0.5 or more.

Fourteenth Aspect

In the process cartridge (e.g., the process cartridge 10Y, 10M, 10C, 10K) according to the thirteenth aspect, the coefficient of static friction of the surface of the foam layer (e.g., the foam layer 224) measured by the Euler belt method is 0.5 or more and 1.5 or less.

Fifteenth Aspect

In the process cartridge (e.g., the process cartridge 10Y, 10M, 10C, 10K) according to the thirteenth aspect, the coefficient of static friction of the surface of the foam layer (e.g., the foam layer 224) measured by the Euler belt method is 0.5 or more and 0.79 or less.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A cleaning device, comprising:

a cleaner to contact a surface of a rotator to clean the surface of the rotator, the cleaner being a roller that includes a foam layer to contact the surface of the rotator, wherein a coefficient of static friction of a surface of the foam layer measured by an Euler belt method is 0.5 or more, and wherein the coefficient of static friction of the surface of the foam layer measured by the Euler belt method is 0.5 or more and 0.79 or less.

2. The cleaning device according to claim 1, wherein:

a foam of the foam layer has a plurality of cells, and a number of the plurality of cells per inch in the foam layer is 30 to 150.

3. The cleaning device according to claim 1, wherein;

a foam of the foam layer has a plurality of cells, and a number of the plurality of cells per inch in the foam layer is 50 to 100.

4. The cleaning device according to claim 1, wherein;

a hardness of a foam of the foam layer is 100 to 500 N.

5. The cleaning device according to claim 1, wherein:

a foam of the foam layer includes foamed polyurethane.

6. The cleaning device according to claim 5, wherein:

the foam has a plurality of adjacent cells that communicate with each other.

7. The cleaning device according to claim 1, wherein:

the rotator is a charging roller that includes a conductor including hard resin and a conductive support rotatably supporting the conductor.

8. The cleaning device according to claim 1, wherein:

the cleaner further includes a core rotatably supporting the foam layer.

9. The cleaning device according to claim 8, wherein:

the core includes metal.

10. The cleaning device according to claim 1, wherein:

an average thickness of the foam layer is 1 to 4 mm.

11. An image forming apparatus comprising:

a latent image bearer to bear a latent image;

a charger including a rotator to charge a surface of the latent image bearer;

a developer to develop the latent image to form a toner image; and a cleaner including a roller including a foam layer to contact a surface of the rotator, wherein a coefficient of static friction of a surface of the foam layer measured by an Euler belt method is 0.5 or more, and wherein the coefficient of static friction of the surface of the foam layer measured by the Euler belt method is 0.5 or more and 0.79 or less.

12. The image forming apparatus according to claim 11, wherein:

the charger further includes a biaser to bias both ends of the rotator toward the latent image bearer.

13. The image forming apparatus according to claim 11, further comprising:

a photoconductor cleaner including a cleaning blade to scrape off residual toner on the latent image bearer.

14. The image forming apparatus according to claim 13, wherein:

the photoconductor cleaner includes a waste-toner conveyor to convey and collect the scraped residual toner.

15. The image forming apparatus according to claim 13, further comprising:

a lubricant applicator downstream from the photoconductor cleaner in a rotation direction of the latent image bearer.

16. The image forming apparatus according to claim 15, wherein:

the lubricant applicator includes a solid lubricant, a brush roller, a compression spring, and an application blade.

17. A process cartridge detachably attachable to a body of an image forming apparatus, the process cartridge comprising:

a latent image bearer to bear a latent image;

a charger including a rotator to charge a surface of the latent image bearer; and a cleaner including a foam layer to contact a surface of the rotator, wherein a coefficient of static friction of a surface of the foam layer measured by an Euler belt method is 0.5 or more, and wherein the coefficient of static friction of the surface of the foam layer measured by the Euler belt method is 0.5 or more and 0.79 or less.

18. The process cartridge according to claim 17, wherein: the developing device includes a developing roller, a first stirring roller, and a second stirring roller.

19. The process cartridge according to claim 17, wherein: the cleaner further includes a core rotatably supporting the foam layer.

20. The process cartridge according to claim 17, wherein: an average thickness of the foam layer is 1 to 4 mm.

* * * * *